United States Patent
Maca

(10) Patent No.: US 6,959,191 B2
(45) Date of Patent: Oct. 25, 2005

(54) SYSTEM FOR GSM INTERFERENCE CANCELLING

(75) Inventor: Gregory A. Maca, Rockwall, TX (US)

(73) Assignee: Andrew Corporation, Orland Park, IL (US)

( * ) Notice: Subject to any disclaimer, the term of this patent is extended or adjusted under 35 U.S.C. 154(b) by 464 days.

(21) Appl. No.: 10/161,441

(22) Filed: Jun. 3, 2002

(65) Prior Publication Data

US 2004/0203858 A1 Oct. 14, 2004

(51) Int. Cl.$^7$ .................................................. H04Q 7/20
(52) U.S. Cl. .................................. 455/456.1; 455/404.2
(58) Field of Search .......................... 455/456.1, 404.2, 455/456.5, 562.1

(56) References Cited

U.S. PATENT DOCUMENTS

| | | | |
|---|---|---|---|
| 4,728,959 A | 3/1988 | Maloney et al. | 342/457 |
| 6,047,192 A | 4/2000 | Maloney et al. | 455/456 |
| 6,108,555 A | 8/2000 | Maloney et al. | 455/456 |
| 6,119,013 A | 9/2000 | Maloney et al. | 455/456 |
| 6,184,829 B1 | 2/2001 | Stilp | 342/387 |
| 6,281,834 B1 | 8/2001 | Stilp | 342/172 |
| 6,295,455 B1 * | 9/2001 | Fischer et al. | 455/456.2 |
| 6,317,081 B1 | 11/2001 | Stilp | 342/387 |
| 6,374,098 B1 * | 4/2002 | Raith et al. | 455/404.2 |
| 6,404,760 B1 * | 6/2002 | Holtzman et al. | 370/342 |
| 2002/0065107 A1 * | 5/2002 | Harel et al. | 455/562 |

* cited by examiner

Primary Examiner—W. R. Young
Assistant Examiner—M. Santiago-Cordero
(74) Attorney, Agent, or Firm—Wood, Herron & Evans, LLP

(57) ABSTRACT

A system for determining the location of a device in a wireless communication network includes at least one antenna for transmitting signals in a wireless communication network. A monitoring unit, located proximate to the at least one antenna, is operable for receiving, as a first input, signals transmitted by the antenna and signals from a device in the network and for receiving, as a second input, signals to be transmitted by the antenna. The monitoring unit includes at least one cancellation stage for modifying the second input and combining the modified second input with the first input to reduce the effect of the transmitted antenna signals on the monitoring unit first input.

51 Claims, 4 Drawing Sheets

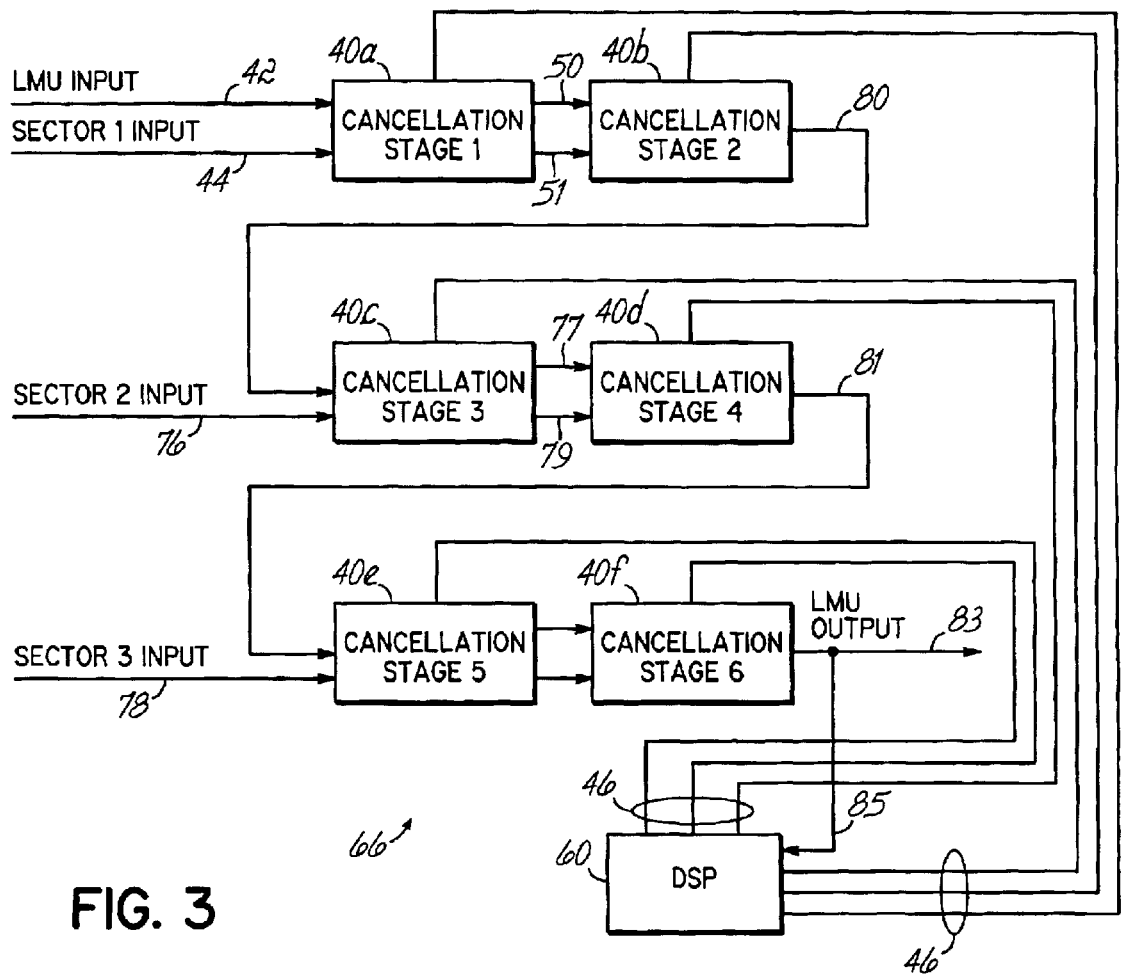
FIG. 3
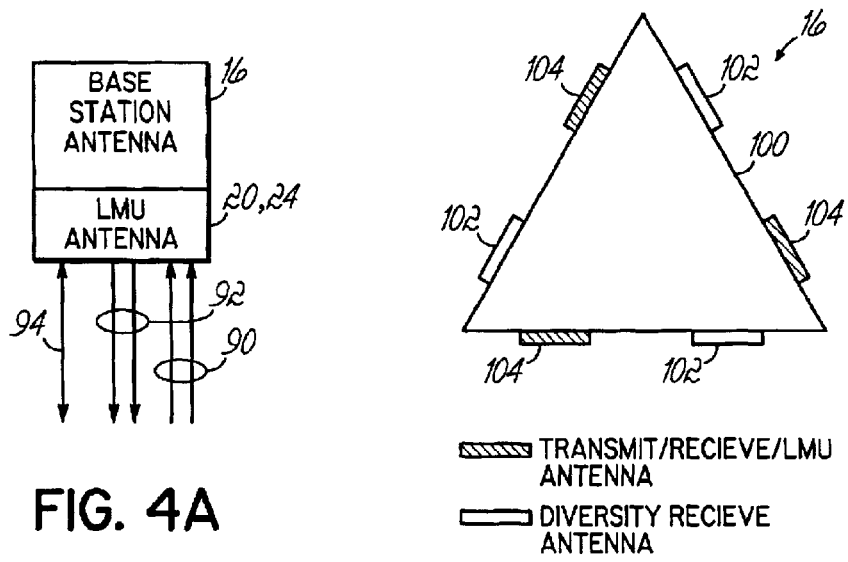
FIG. 4A
FIG. 4B

SYSTEM FOR GSM INTERFERENCE CANCELLING

FIELD OF THE INVENTION

This invention is related to wireless communication systems generally and to the use of 911 services in such a wireless communication system.

BACKGROUND OF THE INVENTION

Emergency 911 or E911 functionality within cellular and wireless communication systems is becoming more extensive as legislative requirements are requiring and mandating such additional capabilities. It is well recognized that traditional 911 services offer the desired emergency time-saving benefits by immediately providing, to emergency personnel, the location or site of an emergency based on the call. Unlike a house or other structure where a fixed phone and associated telephone number are located, wireless systems utilize mobile units. Therefore, location identification for such mobile units is a mandated requirement for cellular systems Location identification and location measurement within a wireless system is utilized to determine the geographical position of a cellular handset, such as a telephone, or of other cellular or wireless equipment used in initiating a 911 call. The determined location is then used by the emergency system to dispatch the necessary services (e.g. medical, fire, etc.) to the location or site. Within a wireless system, such as GSM systems, the location of a particular handset or device is determined by measuring the timing associated with various base stations in proximity to the handset. The timing of the base stations with respect to the handset is then utilized to pinpoint the location of that handset.

However, in a GSM system, the timing parameters associated with each of the various base stations will differ between the base stations because the GSM base stations are asynchronous. To address this situation, a sensor antenna is utilized to measure the timing differences of all the base stations. The sensor antenna is located in a geographically known position. With that known position and the measured timing differences for the various base stations, the location of a handset may be determined within the system.

Generally, the sensor antennas and their hardware, collectively referred to as Location Measurement Units, or LMUs, are positioned at established locations, such as on buildings. As such, the operators of the wireless systems and the owners of the antennas must often make the necessary arrangements with a building owner and must pay the required rent for the building space. For cost savings, maintenance efficiency, and other reasons, the antenna owners would prefer to mount, or co-locate, the LMU sensor antenna with an existing base station. However, such co-location has certain drawbacks which make the timing determinations difficult.

Specifically, the signal which is received by the sensor antenna, from the co-located base station antenna is significantly stronger than the signal received from the other base stations. The strong signal, in turn, will prevent the LMU receiver circuitry from performing properly to determine the timing parameters.

Therefore, it is desirable to reduce costs associated with having additional sites just for location measurement equipment, by providing co-location of such equipment with an existing base station. Furthermore, it is desirable to provide such co-location while ensuring that the LMU operates properly for location determination.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 3 is a schematic block diagram of another embodiment of the invention showing multiple cancellation stages.

FIGS. 4A and 4B are schematic views of a portion of a base station incorporating an embodiment of the present invention.

DETAILED DESCRIPTION OF EMBODIMENTS OF THE INVENTION

Figure 1:
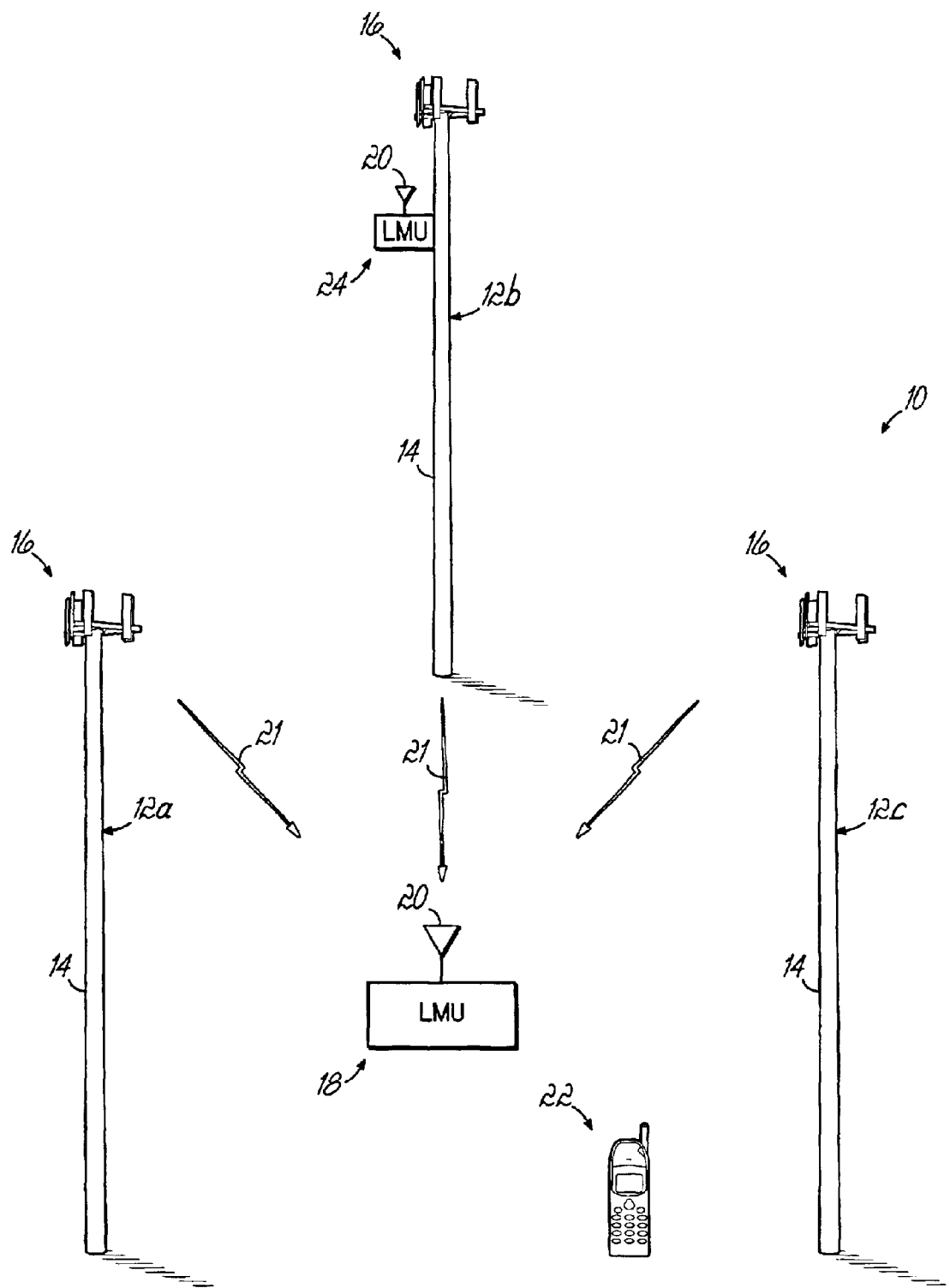
FIG. 1 is a schematic view of a wireless system for utilizing the present invention.

FIG. 1 illustrates a typical wireless communication system, such as a GSM system, in which an embodiment of the present invention might be utilized. The system 10 is shown with three base stations, 12a, 12b, 12c. Such base stations may be typical base stations utilized within a GSM system, for example, and will generally include a tower or support structure 14 of suitable configuration which supports one or more antenna structures or antennas 16, generally proximate the top of the tower. In the system 10 which incorporates a location measurement feature, a location monitor unit (LMU) 18 is shown in proximity to the base stations and incorporates the sensor antenna 20. A cellular handset 22 is also shown, and is designated generally as Customer Premises Equipment (CPE). The CPE may be a handset, or may be any other suitable wireless device for initiating an emergency 911 call.

As discussed above, the operation of the various base stations, 12a, 12b, 12c, in a GSM system is generally asynchronous between the base stations. Therefore, the measured timing for each of those base stations is not automatically correlated. Rather, in an existing system, the LMU 18 is located at a known position remote from the base stations, such as on a building. The LMU 18, utilizing antenna 20, receives signals 21 from the various base stations and measures the timing difference of all base stations with respect to the location of the LMU 18. As is known in the art, utilizing the known position of the LMU, the known position of the base station and the measured timing differences for the base stations, measured at the LMU and the CPE, the position of a CPE device 22 may be determined. The CPE device is also capable of measuring the timing differences between the various base stations, 12a–12c. However, since the CPE device does not have a fixed position, it cannot utilize those timing differences for determining its position and providing that position within the wireless system. Therefore, the separate, fixed-position LMU 18 is utilized.

As noted, base station owners wishing to reduce their system costs desire to co-locate the LMU 18 with an existing base station, rather than have it at a separate position, which has to be rented/purchased and maintained separately. Referring again to FIG. 1, an LMU 24 is shown positioned on tower 14 of base station 12b, in accordance with one aspect of the invention. In that way, a separate location does not have to be acquired and maintained for the LMU. Also, the position of the base station 12b is known, so that the position of LMU 24 may be utilized for determining location measurements of the CPE 22. Generally, in accordance with the principles of the invention, the LMU 24 is located proximate to the base station 12b, and its antennas 16. Its location proximate to the base station or co-located with the base station may entail mounting the LMU on the actual tower (see FIG. 1), or even next to the antennas 16. Alternatively, the LMU might just be located physically on the base station site or property without being mounted on the tower. Therefore, co-locating the LMU with or proximate to a base station is not limited to the embodiment shown in FIG. 1. Rather, such proximity or co-location would also entail a position elsewhere on an existing site or base station.

To address the stronger received signal received by the LMU 24 from the antenna or antennas 16 of base station 12b, the present invention effectively reduces the effects of the transmitted base station antenna signals on the LMU so that the signal level differences at the LMU associated with the various base stations 12a–12c are not so large that the LMU receiver will not be able to perform properly. The present invention, in one aspect, reduces the effects of the base station signals at the LMU 24, associated with base station 12b, while not significantly reducing the signal levels associated with the other base stations 12a and 12c, or the device 22.

Figure 2:
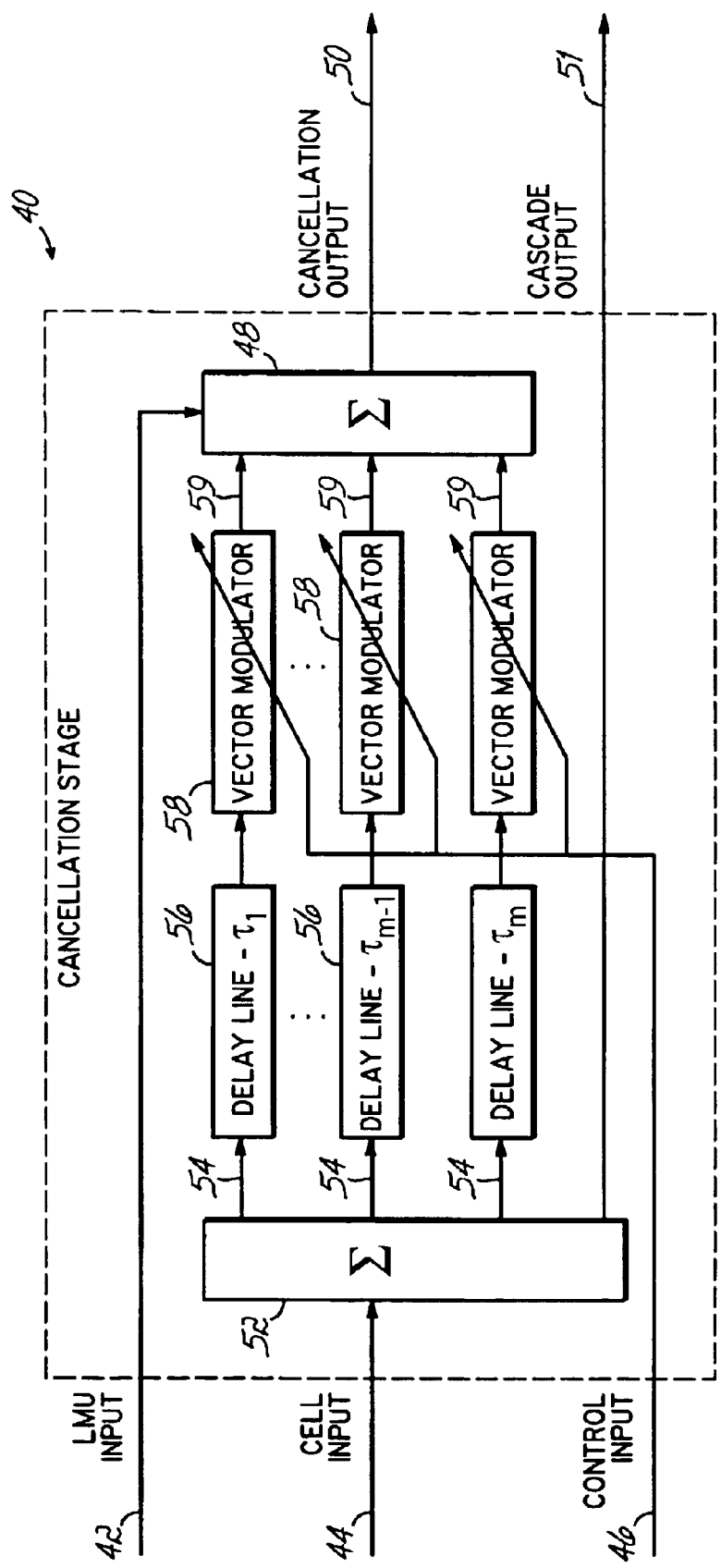
FIG. 2 is a schematic block diagram of one embodiment of the invention.

Turning now to FIG. 2, a schematic of one embodiment of the present invention is illustrated. Specifically, a single cancellation stage 40 of one embodiment of the invention is shown. The inputs to the cancellation stage 40 include an LMU input 42, such as from LMU 24 and antenna 20, a cell input 44, and a control input 46. The LMU input will generally include signals transmitted by antennas of base station 12b, as well as other base stations. For example, it may be desirable to determine the location of device 22. The cell input 44 is from the base station co-located with the LMU 24, such as base station 12b. Input 44 is the transmit signals or signals to be transmitted from the base station 12b (which will be then present on the LMU input) and may be available from coaxial cable or other cable running to the antenna 16. A control input 46 is also utilized by the cancellation stage as discussed below. The LMU input 42 is routed to a summing circuit 48 along with the signals associated with cell input 44. In the summing circuit 48, the effects of the base station signal on the LMU input are cancelled or reduced to produce a cancellation output 50.

Specifically, in accordance with one aspect of the present invention, carrier signals associated with the cell input 44 are delayed and phase inverted to be summed with the LMU input. The LMU input 42 will generally include the strong transmit carrier signals from the antennas 16 of base station 12b, along with the other signals from the other base stations 12a, 12c. The delayed and phase inverted carrier signals from the processed or modified cell input 44 produce desired reduction of the base station 12b carrier signals in the LMU input 42. Referring to FIG. 2, cell input 44 is routed to a summing/splitting circuit 52, which splits the signal 44 equally into m individual signals for further processing. The m signals act as multiple inputs, each reflective of cell input 44. As illustrated in FIG. 2, the cell input 44 may essentially be a cell input associated with the transmitter of one of the sectors of the base station 12b. The summing/splitting circuit 52 provides the signal as m individual signals associated with that sector, illustrated by lines 54. Each of the m signals 54 is then routed to delay circuitry including respective delay line circuits 56 which introduce a delay into the signals 54.

Generally, there will be a certain number of designated carriers at specific carrier frequencies for the sector. Such carriers will show up at the LMU input 42 at high levels. Utilizing m separate delay lines, a plurality of m different phase samples are available for each of the carrier frequencies in the input 44. Within certain parameters, such m different samples provide for the ability to adjust the amplitude and phase of a plurality of m vector modulators 58. Specifically, with each of the delay lines introducing a different delay for each of the frequencies of interest (e.g. carrier frequencies), a unique, linearly independent system of equations results. This indicates that a solution to the system of equations is unique. In accordance with one aspect of the invention, an optimization algorithm may then be utilized and implemented in digital signal processing (DSP) hardware to find a unique solution. The DSP hardware 60 (see FIG. 3) is utilized to control the vector modulation circuitry or vector modulators 58 to control the modification of input 44 to achieve the desired reduction of the signal received by the LMU which is attributable to the co-located base station. The vector modulators provide phase and amplitude shifting of the inputs 54.

The restrictions on the delay lines, as noted for such a system, requires that the m delay lines each have different lengths to provide different delays. In one embodiment, the delay lines are in the form of specific lengths of coaxial cable. The various lengths will depend on the carrier separation in the cell input signal 44. In one possible embodiment, each of the lines might be a multiple of another in length. For example, if one of the lines is X in length, the other lines might be 2X, 3X, 4X, etc. in length.

In the present application, the terms "cancellation" and "cancellation stage" are utilized to indicate the effect of certain portions of the invention on the strong co-located antenna signals on the LMU input. However, in accordance with the principles of the invention, the existence of the co-located antenna signals on the input do not have to be completely cancelled, but rather, are desirably reduced to a level in which they do not affect the operation of the LMU unit.

Figure 5A:
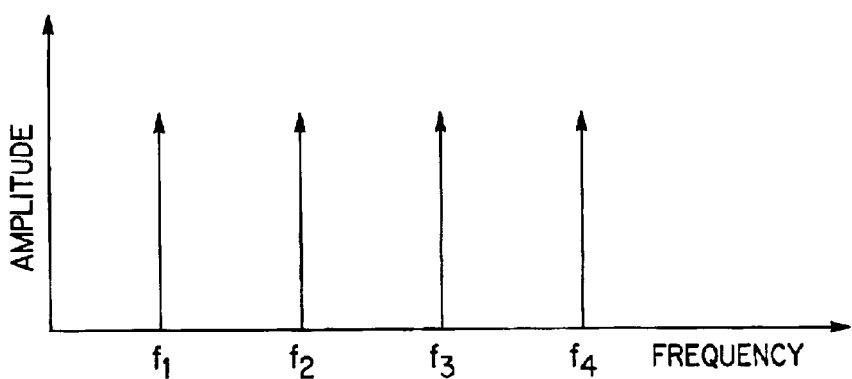
FIGS. 5A, 5B, and 5C are schematic diagrams of the base station signals, the LMU input and the modified LMU, respectively.
Figure 5B:
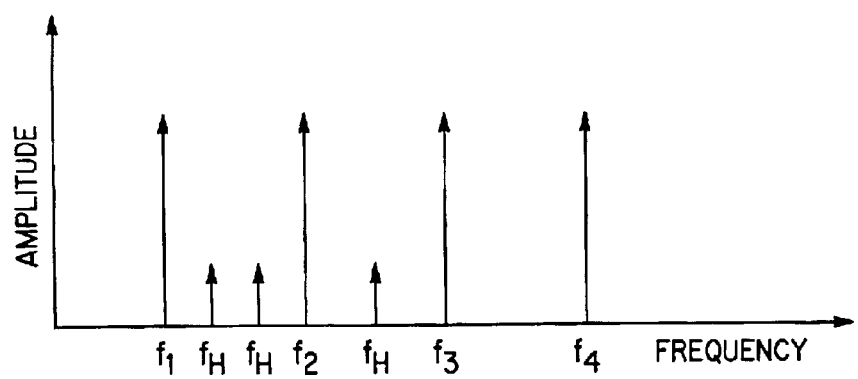
Figure 5C:
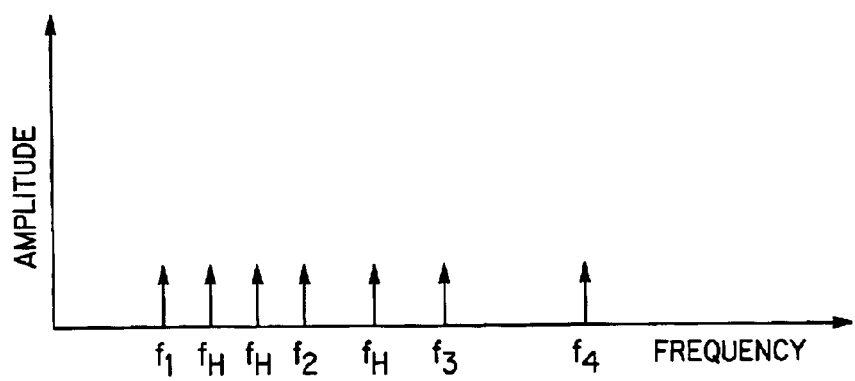

Specifically, referring to FIG. 5A, an example of a cell input is shown, such as for a particular sector. In that cell input 44, four carrier frequencies, $f_1$, $f_2$, $f_3$, and $f_4$ are illustrated, by way of example. A greater or lesser number of carriers might also exist. Such signals transmitted by the co-located antenna, or antennas 16, will be received by the LMU antenna 20, and thus input to the LMU 24. FIG. 5B illustrates such an LMU input 42 which includes additional signals $f_H$ in addition to the carrier signals $f_1$–$f_4$. For example, the signals $f_H$ might include signals from the other base stations. As may be seen in FIG. 5B, the amplitudes of the co-located antenna signals $f_1$–$f_4$ are significantly higher than the amplitudes of the other signals $f_H$, which are to be utilized by the LMU. Therefore, the amplitude of the carrier signals $f_1$–$f_4$ must be effectively reduced so that generally they are of similar amplitude to those signals $f_H$, or at least at a level where they do not interfere with the LMU operation. Specifically, FIG. 5C illustrates a desired result of the invention, wherein the cancellation output reduces the co-located antenna signals $f_1$–$f_4$ to a desirable level so they do not interfere detrimentally with the operation of the LMU.

Returning to FIG. 2, the vector modulator circuits provide the necessary attenuation, and amplitude and phase shifting of the signals such that when the signals on lines 59 are used in the summing circuit 48, they effectively provide reduction/cancellation to the carrier signals associated with the LMU input 42. Perfect cancellation generally will not be achieved, and is not particularly desired. Rather, it is desirable to reduce the effects of the co-located cellular signals 44 to reduce the effect of those signals on the LMU and its operation in providing a location measurement. For example, a reduction of 50 dB may be suitable. FIG. 2 shows vector modulators, but in another embodiment, individual phase shifters and attenuators may be utilized instead of the vector modulators.

To achieve the desired cancellation and/or reduction, the vector modulators (or phase shifters/attenuators) are controlled by a control input 46 that sets the level of the desired attenuation and phase shift of the signals to provide a desired reduction of the effect of the carrier signals in the LMU input 42 and in the operation of the LMU. The resulting output on line 50, which is a modified LMU input 42, may then be utilized by the LMU circuitry for making a proper location measurement.

Turning to FIG. 3, digital signal processing (DSP) circuitry 60 provides the desired control inputs 46 for obtaining the necessary cancellation and reduction on the output 50 of cancellation stage 40. The optimization algorithm utilized to find the unique solution for the independent system of equations is implemented in the DSP circuitry 60 and the DSP uses control inputs 46 to control the vector modulators 58. As illustrated in FIG. 2 on line 51, the cell input 44 is also passed through the cancellation stage as a cascade output 51 from the splitting circuit 52, for use in subsequent cancellation stages.

It may be desirable to cascade a plurality of cancellation stages 40, 40b within a sector in order to achieve the desired cancellation. Subsequent cancellation stages receive the combined modified output 51 from a previous cancellation stage, and are operable for further reducing the effect of the co-located antenna signals on the LMU input. For the next subsequent cancellation stage (see FIG. 3), the cancellation output 50 (modified LMU input 42) and cascade output 51 (cell input 44) are passed forward.

Referring to FIG. 3, an embodiment of the present invention is illustrated for use with 3 sectors. Generally, as shown in FIG. 4B, a base station may include antennas 16 directed in three different directions, to essentially define three different sectors. A greater or lesser number of sectors may also be utilized, and a three-sector base station is described as an example. The three sector system 66 includes a plurality of cancellation stages 40a–40f, as illustrated. Essentially two cascaded cancellation stages are illustrated for each sector. For example, cancellation stages 40a and 40b are illustrated for sector 1, cancellation stages 40c and 40d are illustrated for sector 2, and cancellation stages 40e and 40f are illustrated for sector 3. System 66 provides cancellation and/or a reduction of the effects of the signals from each of the sectors on the LMU input. In that way, all of the possible effects of the various sector signals of the base station on the co-located LMU are addressed.

Referring to FIG. 3, the inputs include the LMU input 42 which will have signals associated with the sectors), the cell input 44 (reflective of sector 1) and additional inputs 76, 78 which are reflective of the cell inputs for sectors 2 and 3. LMU input 42 passes through the cancellation stage 40a providing a cancellation output signal 50 (see FIG. 2). The sector 1 antenna input also is utilized in the cancellation stage 40a as the cell input 44 to provide the desired reduction of the effect of the sector 1 signals on the LMU input 42. The sector 1 input signal 44 is also passed through the cancellation stage as cascade output 51 to the next cancellation stage 40b. The second cancellation stage 40b is also utilized for further reducing the effect of the sector 1 input 44 on the LMU input 42. In the output signal 80 from cancellation stage 40b, the effects of the sector 1 antenna on the LMU have been reduced.

That signal 80 is provided as an output and is then routed to additional cascaded cancellation stages 40c–40f to be an input to reduce the effects of the inputs from sectors 2 and 3. The cancellation for each of those sectors also utilizes two separate cancellation stages. Signal 80 is an input to cancellation stage 3, along with the sector 2 cell input 76. The output 77 of stage 3, along with the cascaded cell input 79 are then passed as inputs to cancellation stage 4. Similarly, output signal 81 is passed through to the next cancellation stages 5 and 6 to combine with cell input signal 78 and to produce the LMU output 83, which is the modified LMU input 42 and will ultimately be reflective of the reduced effects of the various sector antenna signals in the LMU input.

The DSP circuitry 60 is coupled to each of the cancellation stages 40a–40f and controls the operation of the vector modulators 58 in each of those cancellation stages for providing the desired cancellation and/or reduction in the LMU output 83. The LMU output 83 from the cancellation stage or stages is used by the LMU for determining the position of CPE. In one embodiment, the invention might be incorporated into an LMU unit. Alternatively, the invention might be a separate unit which is used in conjunction with a separate LMU. The LMU output 83 is fed as an input to the DSP circuitry 60, as illustrated on line 85, in order to ensure that the DSP circuitry provides the necessary adjustments for the desired reduction in the effect of the cell inputs on the LMU output.

FIGS. 4A and 4B illustrate an LMU adaptive antenna in accordance with one aspect of the present invention. As illustrated in FIG. 4A, the LMU unit 24 and antenna 20 are co-located with the various base station antennas 16. The LMU unit 24 might incorporate the invention therein or the invention may be a separate unit which is indicated in the drawing collectively by the representative element 24. The various signals from the antennas are handled over suitable transmit lines 90 and receive lines 92. A coax or fiber cable 94 is utilized for providing the necessary digital interface from the DSP to the cancellation circuitry of the LMU antenna 24.

FIG. 4B illustrates a schematic view of the antennas on a tower. The tower structure 100 illustrated essentially defines three sectors and includes two antenna structures 102 and 104 on each sector. The antenna structures 102 may be diversity receive antenna structures, as are known in the art. The antenna structures 104 are indicative of the transmit/receive antennas along with the LMU unit 24 and antenna 20 and associated cancellation circuitry. In one embodiment, only one of the antenna structures 102 might include the LMU unit 24. Alternatively, all of the various antenna structures 102 for each of the sectors might include the LMU units and circuitry and the signal reduction capability for independent location measurements in each of the sectors.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A monitoring unit for determining the location of a device in a wireless communication network comprising:

a unit configured for being positioned proximate to at least one antenna transmitting signals in a wireless communication network, the unit operable for receiving, as a first input, signals transmitted by an antenna and signals from a device in the network and receiving, as a second input, signals for being transmitted by an antenna;

the unit including at least one cancellation stage for modifying the second input and combining the modified second input with the first input to reduce the effect of transmitted antenna signals on the unit first input.

2. The monitoring unit of claim 1 wherein the cancellation stage includes delay circuitry for delaying the second input.

3. The monitoring unit of claim 1 wherein the cancellation stage includes vector modulation circuitry for at least one of phase and amplitude shifting the second input.

4. The monitoring unit of claim 3 further comprising digital signal processing circuitry coupled to the cancellation stage for controlling the at least one of the phase and amplitude shifting of the second input.

5. The monitoring unit of claim 4 wherein said digital signal processing circuitry is operable for executing an optimization algorithm for optimally controlling phase and amplitude shifting of the multiple inputs to reduce the effect of the transmitted antenna signals on the monitoring unit first input.

6. The monitoring unit of claim 5 wherein the combined modified second input and first input form an output for the cancellation stage, the digital signal processing circuitry receiving the output and controlling the operation of the cancellation stage based on the output.

7. The monitoring unit of claim 1 wherein said second input is split into multiple inputs prior to being modified in the cancellation stage.

8. The monitoring unit of claim 7 wherein the cancellation stage includes delay circuitry for delaying each of the multiple inputs.

9. The monitoring unit of claim 8 wherein the delay circuitry includes a delay line for each of the multiple inputs for providing a plurality of delayed inputs.

10. The monitoring unit of claim 7 wherein the cancellation stage includes vector modulation circuitry for at least one of phase and amplitude shifting each of the multiple inputs.

11. The monitoring unit of claim 10 further comprising digital signal processing circuitry coupled to the vector modulation circuitry for controlling the at least one of the phase and amplitude shifting of the multiple inputs.

12. The monitoring unit of claim 11 wherein said digital signal processing circuitry is operable for executing an optimization algorithm for optimally controlling phase and amplitude shifting of the second input to reduce the effect of the transmitted antenna signals on the monitoring unit first input.

13. The monitoring unit of claim 1 further comprising digital signal processing circuitry coupled to the monitoring unit for controlling the modification to the second input.

14. The monitoring unit of claim 1 further including multiple cascaded cancellation stages, with at least one subsequent cancellation stage receiving the combined modified second input and first input from a previous cancellation stage and operable for further reducing the effect of transmitted antenna signals on the monitoring unit first input.

15. A system for determining the location of a device in a wireless communication network comprising:

at least one antenna for transmitting signals in a wireless communication network;

a monitoring unit, located with the antenna, the monitoring unit operable for receiving, as a first input, signals transmitted by the antenna and signals from a device in the network and receiving as a second input signals to be transmitted by the antenna;

the monitoring unit including at least one cancellation stage for modifying the second input and combining the modified second input with the first input to reduce the effect of the transmitted antenna signals on the monitoring unit first input.

16. The system of claim 15 wherein the cancellation stage includes delay circuitry for delaying the second input.

17. The system of claim 15 wherein the cancellation stage includes vector modulation circuitry for at least one of phase and amplitude shifting the second input.

18. The system of claim 17 further comprising digital signal processing circuitry coupled to the cancellation stage for controlling the at least one of the phase and amplitude shifting of the second input.

19. The system of claim 18 wherein said digital signal processing circuitry is operable for executing an optimization algorithm for optimally controlling phase and amplitude shifting of the multiple inputs to reduce the effect of the transmitted antenna signals on the monitoring unit first input.

20. The system of claim 19 wherein the combined modified second input and first input form an output for the cancellation stage, the digital signal processing circuitry receiving the output and controlling the operation of the cancellation stage based on the output.

21. The system of claim 15 wherein said second input is split into multiple inputs prior to being modified in the cancellation stage.

22. The system of claim 21 wherein the cancellation stage includes delay circuitry for delaying each of the multiple inputs.

23. The system of claim 22 wherein the delay circuitry includes a delay line for each of the multiple inputs for providing a plurality of delayed inputs.

24. The system of claim 21 wherein the cancellation stage includes vector modulation circuitry for at least one of phase and amplitude shifting each of the multiple inputs.

25. The system of claim 24 further comprising digital signal processing circuitry coupled to the vector modulation circuitry for controlling the at least one of the phase and amplitude shifting of the multiple inputs.

26. The system of claim 25 wherein said digital signal processing circuitry is operable for executing an optimization algorithm for optimally controlling phase and amplitude shifting of the second input to reduce the effect of the transmitted antenna signals on the monitoring unit first input.

27. The system of claim 15 further comprising digital signal processing circuitry coupled to the monitoring unit for controlling the modification to the second input.

28. The system of claim 15 wherein the monitoring unit includes multiple cascaded cancellation stages, with at least one subsequent cancellation stage receiving the combined modified second input and first input from a previous cancellation stage and operable for further reducing the effect of the transmitted antenna signals on the monitoring unit first input.

29. The system of claim 15 further comprising multiple antennas for transmitting signals into multiple sectors of the wireless communication network, the monitoring unit operable for receiving, as additional inputs, signals to be transmitted by respective sector antennas and including at least one cancellation stage for the respective sectors, the sector cancellation stages being operable for modifying a respective sector input and combining the modified sector input with the first input to reduce the effect of the transmitted sector antenna signals on the monitoring unit first input.

30. The system of claim 29 wherein said sector cancellation stages are cascaded so that the effect of transmitted sector antenna signals of one sector are reduced subsequent to a reduction of the effect of sector antenna signals of a previous sector.

31. A system for determining the location of a device in a wireless communication network comprising:

a base station with multiple sector antennas defining individual sectors of a wireless communication network;

a monitoring unit, located with the base station, the monitoring unit operable for receiving, as a first input, signals transmitted by the base station sector antennas and signals from a device in the network and receiving, as additional sector inputs, the signals to be transmitted by respective sector antennas;

the monitoring unit including at least one cancellation stage for each of the sectors, the cancellation stages operable for modifying the respective sector inputs for the sectors and combining the modified sector inputs with the first input to reduce the effect of the sector antenna signals on the monitoring unit first input.

32. The system of claim 31 wherein each of the sector cancellation stages has, as an output, the monitoring unit first output with reduced signals of the respective sector, the cancellation stages being cascaded, such that the output of one cancellation stage is used as an input for the next cancellation stage.

33. The system of claim 31 further comprising multiple cancellation stages for each of the sectors, the sector input being passed through at least one of the cancellation stages of a sector to the next cancellation stage for being modified by that next cancellation stage.

34. A method for determining the location of a device in a wireless communication network wherein at least one antenna is transmitting signals in the network, the method comprising:

monitoring the network with a monitoring unit located proximate to the at least one antenna and receiving, as a first input, signals transmitted by the at least one antenna and signals from a device in the network;

receiving, as a second input, signals to be transmitted by the antenna;

modifying the second input;

combining the modified second input with the first input to reduce the effect of the transmitted antenna signals on the monitoring unit first input.

35. The method of claim 34 wherein modifying the second input includes delaying the second input.

36. The method of claim 34 wherein modifying the second input includes at least one of phase shifting and amplitude shifting the second input.

37. The method of claim 36 further comprising using a vector modulator to perform the at least one of phase shifting and amplitude shifting of the second input.

38. The method of claim 36 further comprising controlling the at least one of the phase and amplitude shifting of the multiple inputs using digital signal processing.

39. The method of claim 38 further comprising executing an optimization algorithm with the digital signal processing for optimally controlling phase and amplitude shifting of the multiple inputs.

40. The method of claim 39 wherein the antenna is a base station antenna.

41. The method of claim 38 wherein the combined modified second input and first input form an output and further comprising using the output in the digital signal processing to control the phase and amplitude shifting of the second input.

42. The method of claim 34 further comprising splitting the second input into multiple inputs for modifying.

43. The method of claim 42 wherein modifying the second input includes delaying the multiple inputs.

44. The method of claim 43 further comprising delaying each of the multiple inputs differently.

45. The method of claim 42 wherein modifying the multiple inputs includes at least one of phase shifting and amplitude shifting the inputs.

46. The method of claim 45 further comprising using a vector modulator to perform the at least one of phase shifting and amplitude shifting of the inputs.

47. The method of claim 45 further comprising controlling at least one of the phase and amplitude shifting of the multiple inputs using digital signal processing.

48. The method of claim 47 further comprising executing an optimization algorithm with the digital signal processing for optimally controlling phase and amplitude shifting of the multiple inputs.

49. The method of claim 34 further comprising modifying the second input in each of multiple stages and combining the modified second input with the first input at each stage to reduce the effect of the transmitted antenna signals on the monitoring unit first input.

50. A method for determining the location of a device in a wireless communication network including at least one base station with multiple sector antennas defining individual sectors of the network, the method comprising:

monitoring the network with a monitoring unit located proximate to the base station and receiving, as a first input, signals transmitted by the sector antennas and signals from a device in the network;

receiving, as additional sector inputs, the signals to be transmitted by respective sector antennas;

modifying the respective sector inputs for the sectors;

combining the modified sector inputs with the first input to reduce the effect of the sector antenna signals on the monitoring unit first input.

51. The method of claim 50 further comprising combining a modified sector input of one sector with the first input to produce an output, and combining that output with a modified sector input of another sector to reduce the effect of the sector antenna signals on the first input.

* * * * *

UNITED STATES PATENT AND TRADEMARK OFFICE
CERTIFICATE OF CORRECTION

PATENT NO. : 6,959,191 B2  Page 1 of 1
APPLICATION NO. : 10/161441
DATED : October 25, 2005
INVENTOR(S) : Gregory A. Maca It is certified that error appears in the above-identified patent and that said Letters Patent is hereby corrected as shown below:

Column 1, line 21 reads "...mobile units is a mandated requirement for cellular systems" and should read -- ... mobile units is a mandated requirement for cellular systems. --.

Column 4, line 24 reads "...system, requires that the m delay lines each have different..." and should read -- ...system, require that the m delay lines each have different... --.

Column 5, line 58 reads "...which will have signals associated with the sectors), the cell ..." and should read -- ... (which will have signals associated with the sectors), the cell ... --.

Column 6, line 67 reads "...broader aspects is not limited to the specific details repre-..." and should read -- ...broader aspects is not limited to the specific details, repre-... --.

DRAWINGS, Fig. 4B reads,
" TRANSMIT/RECIEVE/LMU ANTENNA
   DIVERSITY RECIEVE ANTENNA" and should read
-- TRANSMIT/RECEIVE/LMU ANTENNA
   DIVERSITY RECEIVE ANTENNA --.

Signed and Sealed this

Third Day of October, 2006

JON W. DUDAS
*Director of the United States Patent and Trademark Office*